(12) United States Patent
Koc et al.

(10) Patent No.: US 7,663,820 B2
(45) Date of Patent: Feb. 16, 2010

(54) POSITION SENSING DEVICE AND LENS DRIVING MODULE USING THE SAME

(75) Inventors: Burhanettin Koc, Suwon-si (KR); Jung Seok Lee, Suwon-si (KR); Yun Seok Woo, Gunpo-si (KR); Hyun Phill Ko, Seongnam-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 12/219,314

(22) Filed: Jul. 18, 2008

(65) Prior Publication Data

US 2009/0284844 A1 Nov. 19, 2009

(30) Foreign Application Priority Data

May 13, 2008 (KR) .................. 10-2008-0043833

(51) Int. Cl.
*G02B 7/02* (2006.01)

(52) U.S. Cl. .................. 359/819; 359/821; 359/822
(58) Field of Classification Search .................. 359/811, 359/821, 822, 823, 824, 826
See application file for complete search history.

(56) References Cited

U.S. PATENT DOCUMENTS 5,229,836 A * 7/1993 Nagano .................. 356/618
7,450,321 B2 * 11/2008 Shih et al. .................. 359/698

* cited by examiner

*Primary Examiner*—Timothy J Thompson

(57) ABSTRACT

Provided is a position sensing device including a sensing unit that is mounted on one side of a lens barrel, which is inserted into a lens housing portion of a base so as to be vertically driven, and includes a light receiving section and a light emitting section which are provided to face each other; a driven grid that has a plurality of slits formed therein and is mounted on the lens barrel; and a fixed grid that has a plurality of slits formed therein and is fixed and coupled to the inside of the sensing unit.

14 Claims, 5 Drawing Sheets

[FIG. 1]
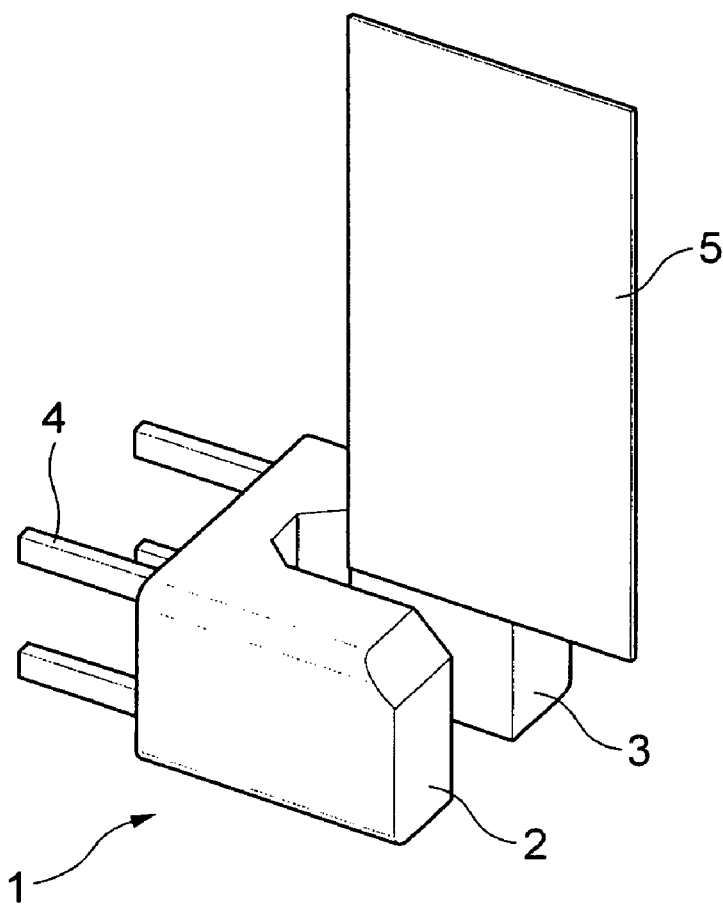
[FIG. 2]
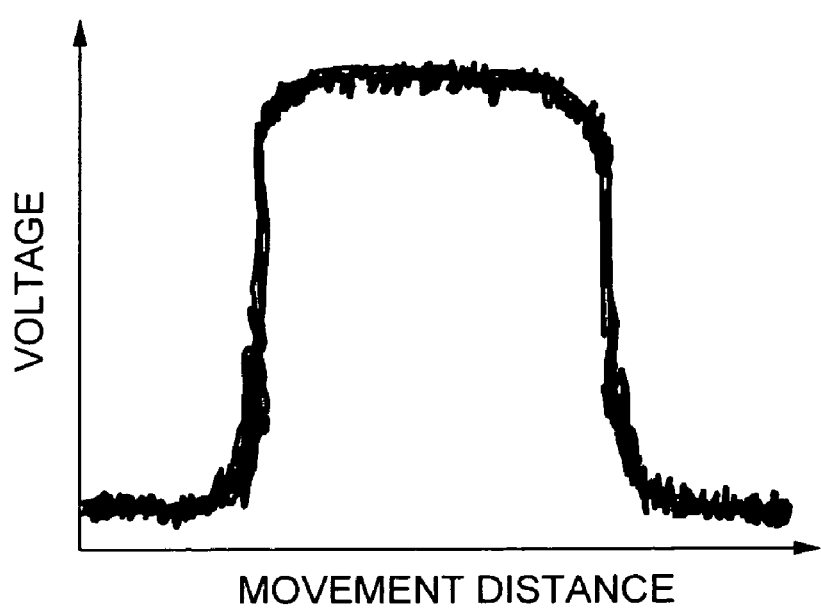

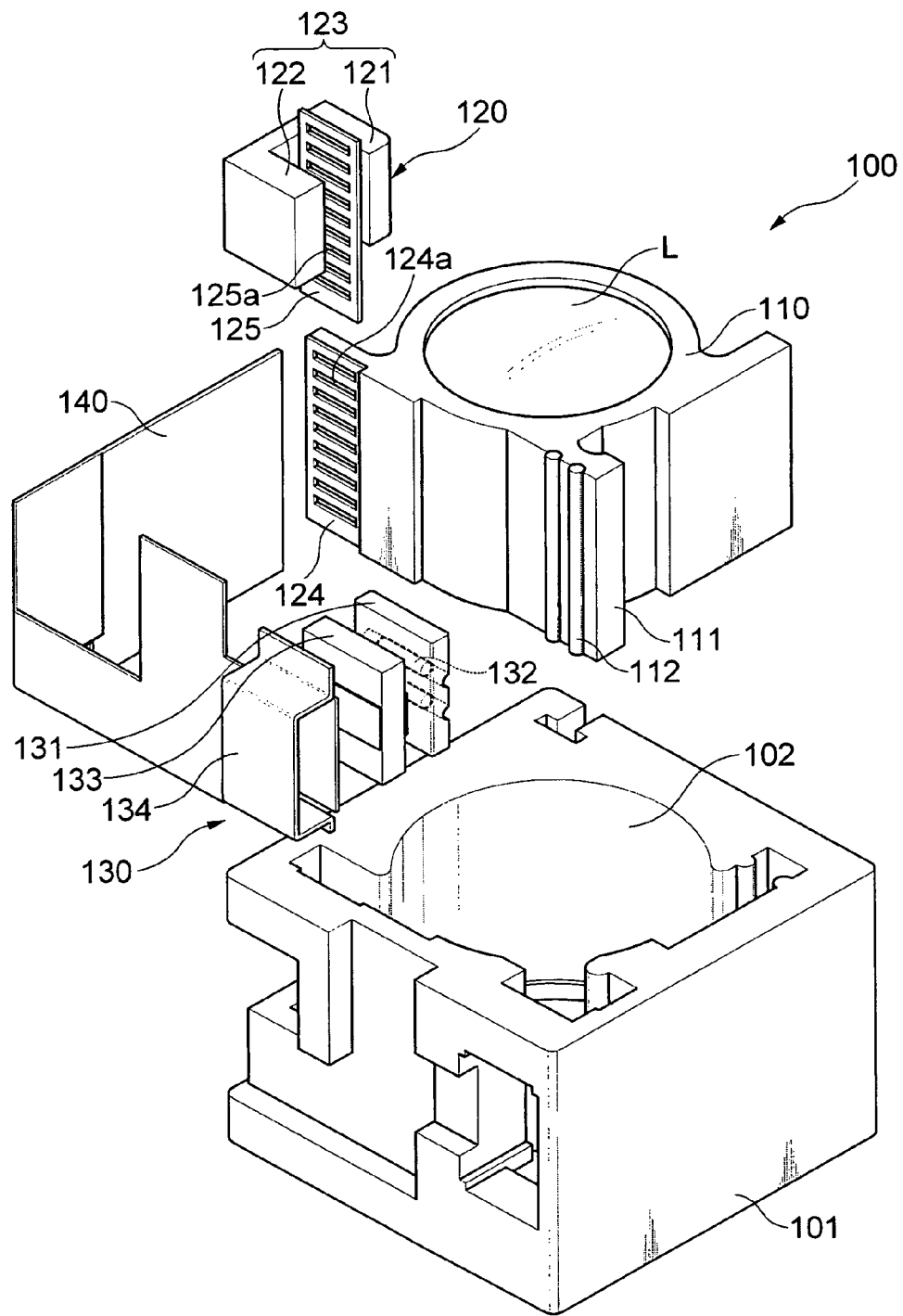

[FIG. 4]
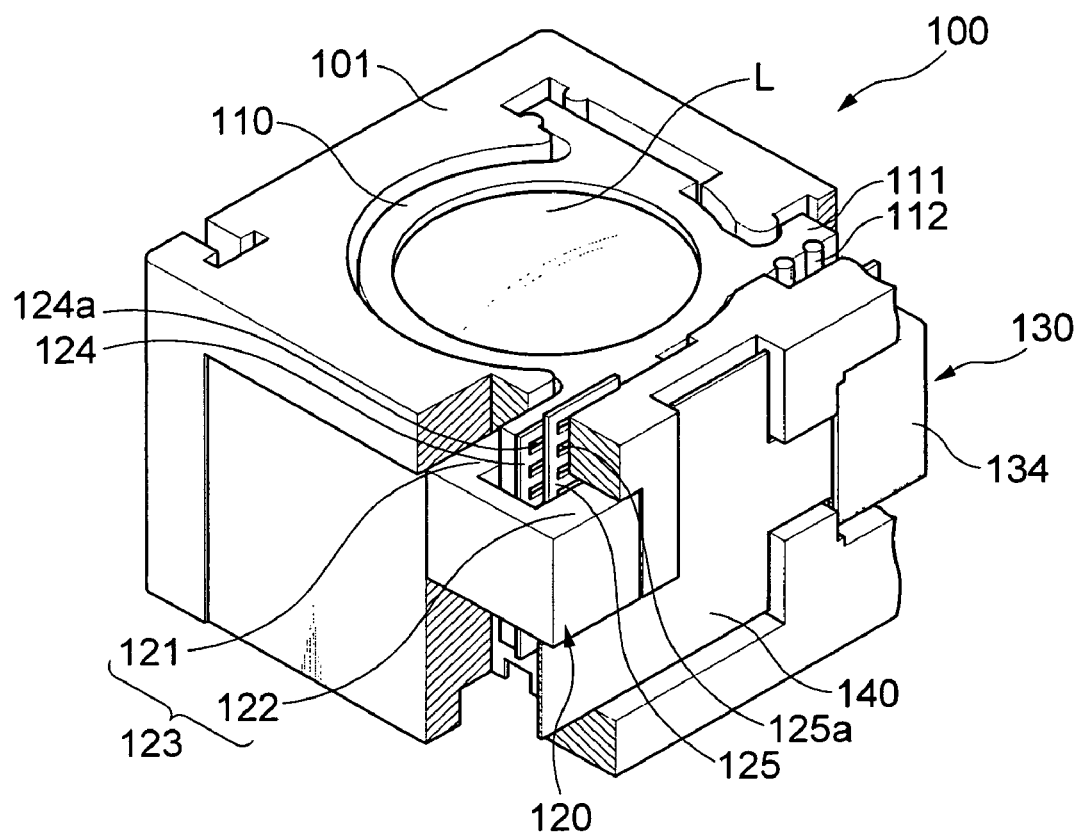

[FIG. 5]
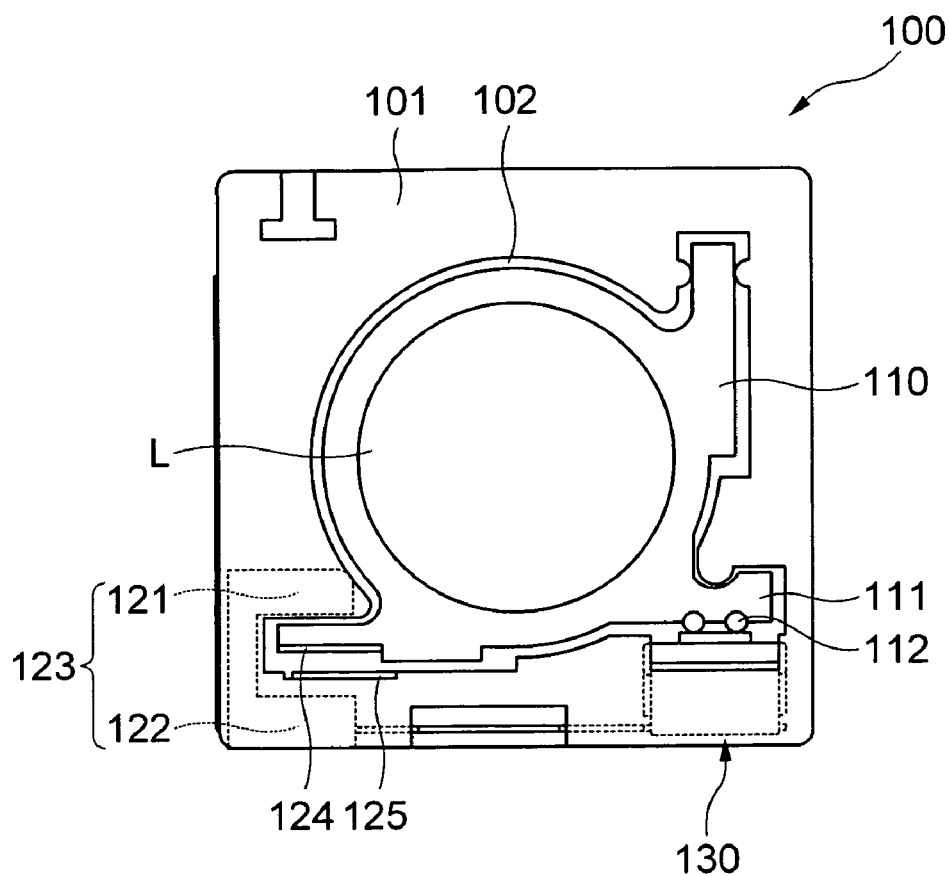
[FIG. 6]
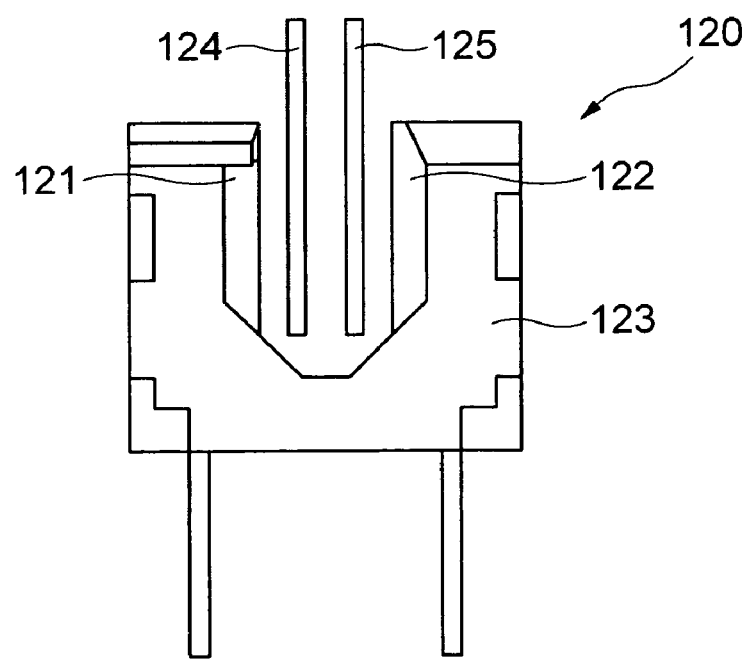

[FIG. 7]
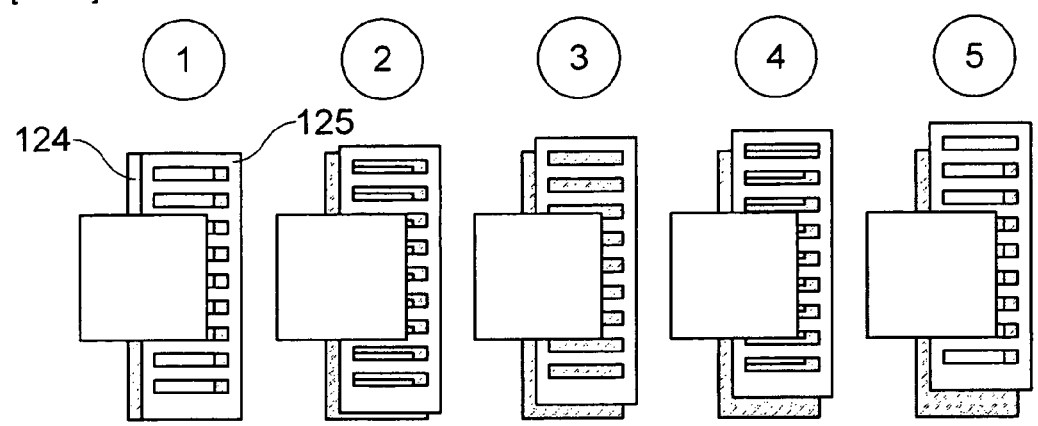
[FIG. 8]
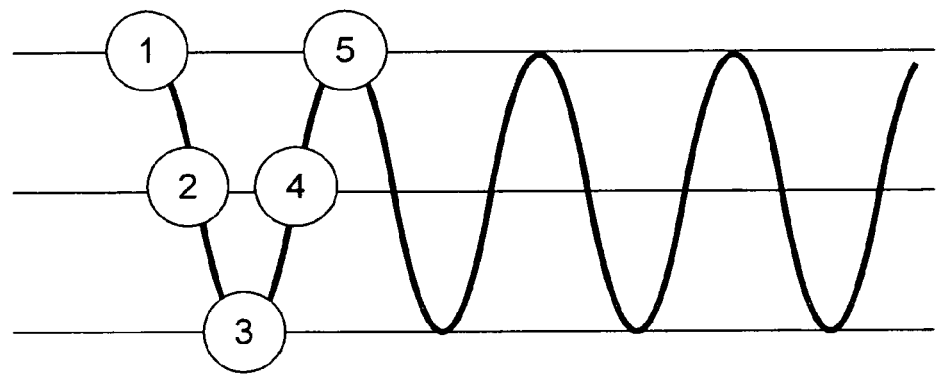

POSITION SENSING DEVICE AND LENS DRIVING MODULE USING THE SAME

CROSS-REFERENCE TO RELATED APPLICATIONS

This application claims the benefit of Korean Patent Application No. 10-2008-0043833 filed with the Korea Intellectual Property Office on May 13, 2008, the disclosure of which is incorporated herein by reference.

BACKGROUND OF THE INVENTION

1. Field of the Invention

The present invention relates to a position sensing device and a lens driving module using the same.

2. Description of the Related Art

With recent technical developments, portable terminals such as mobile phone and personal digital assistant (PDA) are used as multi convergence in music, movie, TV, and game as well as phone call function. One typical technology for the multi convergence is a camera module. A resolution of the camera module is changing from 300,000 pixels (VGA) to more than 7,000,000 pixels. Simultaneously, a variety of functions such as auto focusing (AF) and optical zoom are realized.

In particular, demand for mobile phones having a camera module with the AF function mounted therein is rapidly increasing, because the mobile phones can provide a high-quality image regardless of a focal distance from an object.

In the camera module with the AF function, as a lens barrel having a plurality of lenses stacked therein or the lenses inside the lens barrel is/are vertically driven by an actuator composed of an electromagnetic motor or piezoelectric element, the focus is adjusted regardless of a distance from an object. The actuator is driven by a position sensing device which sets an initial position for accurately performing focus adjustment of the lenses.

FIG. 1 is a perspective view of a conventional position sensing device mounted in a camera module. FIG. 2 is a graph showing a movement distance in accordance with a voltage generated by the conventional position sensing device. As shown in FIG. 1, the conventional position sensing device includes a sensor 1 having a body composed of a light receiving section 2 and a light emitting section 3 facing each other and a light shield 5 inserted between the light receiving section 2 and the light emitting section 3 of the sensor 1.

The sensor 1 is mounted on a side surface of a lens barrel (not shown) or on a barrel driving section through a plurality of holders 4.

In the sensor 1, light emitted from the light emitting section 3 is incident on the light receiving section 2, and the actuator which transfers the lenses is driven by the light incident on the light receiving section 2. At this time, the receiving and shielding of the light received by the receiving section 2 of the sensor 1 is controlled by the light shield 5 which is mounted so as to be vertically transferred between the light receiving section 2 and the light emitting section 3. As the light shield 5 is vertically transferred, portions of the light receiving section 2 and the light emitting section 3 are shielded. At this time, while the light transmitted between the light receiving section 2 and the light emitting section 3 is converted, a voltage is generated. Then, the lens is transferred by the actuator driven by the generated voltage.

At this time, when the lens reaches the initial position, the light shield 5 between the light emitting section 3 and the light receiving section 2 shields the entire area of the light emitting section 3 and the light receiving section 2 such that the light transmitted therebetween is completely shielded. Then, the initial position of the lens in a state where the voltage is not applied can be sensed.

Further, when the light shield 5 between the light emitting section 3 and the light receiving section 2 is transferred upward such that the transmission of light therebetween begins, a predetermined voltage is applied to the actuator for transferring the lens. Then, the actuator is continuously driven.

Therefore, the conventional position sensing device can relatively accurately sense the initial position of the lens. However, in a state where the light shield 5 is positioned in a position between the light emitting section 3 and the light receiving section 2, the position sensing device cannot sense the position of the lens. Therefore, it is difficult to measure how much the actuator should be driven so as to reach the initial position.

Further, when the light shield 5 is positioned in such a manner that the transmission of light between the light emitting section 3 and the light receiving section 2 can be performed, and if the lens is physically transferred to the initial position, the lens may collide with other components such that the lens and the actuator are damaged.

That is, as shown in FIG. 2, only the application of voltage to the actuator for transferring the lens can be grasped through the transmission and shielding of the light by using the light shield 5 between the light receiving section 2 and the light emitting section 3. Therefore, the lens cannot be transferred in a stepwise manner, and the failure rate of the actuator increases due to the rapid transfer of the actuator.

SUMMARY OF THE INVENTION

An advantage of the present invention is that it provides a position sensing device and a lens driving module using the same, in which a pair of girds having a plurality of slits formed therein are installed between a light emitting section and a light receiving section inside the lens driving module having an actuator built therein, and which can grasp the position, direction, and driving speed of a lens barrel through a voltage difference depending on a quantity of light transmitted through the slits of the grids.

Additional aspects and advantages of the present general inventive concept will be set forth in part in the description which follows and, in part, will be obvious from the description, or may be learned by practice of the general inventive concept.

According to an aspect of the invention, a position sensing device comprises a sensing unit that is mounted on one side of a lens barrel, which is inserted into a lens housing portion of a base so as to be vertically driven, and includes a light receiving section and a light emitting section which are provided to face each other; a driven grid that has a plurality of slits formed therein and is mounted on the lens barrel; and a fixed grid that has a plurality of slits formed therein and is fixed and coupled to the inside of the sensing unit.

The sensing unit having a body formed in a U shape may be mounted on a wall portion of the base, and the light receiving section may receive light emitted from the light emitting section so as to generate a voltage.

The light emitting section of the sensing unit may include a light emitting chip which emits infrared rays, and the light receiving section may include a light receiving element which receives the light emitted from the light emitting section.

The slits formed in the driven grid and the fixed grid, respectively, may repeatedly overlap each other such that the light emitted from the light emitting section is transmitted through the overlapping slits so as to be incident on the light receiving section.

The slits may have the same width in the longitudinal direction thereof, and the distance between the slits may be constant.

Preferably, the width of the slits is set in the range of 0.5 to 20 μm. More preferably, the width of the slits is set in the range of 5 to 10 μm.

The width of the slits may be set to the same value as a focus adjustment distance of the lens barrel.

According to another aspect of the invention, a lens driving module comprises a base that has a barrel housing portion formed in the central portion thereof; a lens barrel that is inserted into the base so as to be vertically driven and has one or more lenses stacked therein; a position sensing device that is mounted in one side of the lens barrel and has a sensing unit including a light receiving section and a light emitting section, which are formed so as to face each other, and a pair of grids respectively including a plurality of slits formed therein, the slits repeatedly overlapping each other inside the sensing unit; a piezoelectric actuator that is mounted on the other side of the lens barrel and moves the lens barrel in an optical-axis direction when a voltage is applied; and a flexible printed circuit board (FPCB) that surrounds the outside of the lens barrel and of which one side portion is connected to a driving unit so as to apply an electric signal.

The sensing unit having a body formed in a U shape may be mounted on a wall portion of the base, and the light receiving section receives light emitted from the light emitting section through the overlapping slits so as to generate a voltage.

The slits may have the same width in the longitudinal direction thereof, and the distance between the slits may be constant.

Preferably, the width of the slits is set in the range of 0.5 to 20 μm.

The piezoelectric actuator, which is contact-supported by a guide portion extending from the lens barrel, may vibrate in the longitudinal direction thereof and may be deformed in the thickness direction thereof so as to vertically drive the lens barrel in the optical-axis direction.

The piezoelectric actuator may include a piezoelectric vibrator, a conductive buffer member which is closely coupled to the piezoelectric vibrator, and a plate spring for closely attaching the piezoelectric vibrator to the conductive buffer member.

The piezoelectric vibrator may have a pair of friction members mounted on the inner surface thereof.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a perspective view of a conventional position sensing device mounted in a camera module;

FIG. 2 is a graph showing a movement distance in accordance with a voltage generated by the conventional position sensing device;

FIG. 3 is an exploded perspective view of a lens driving module to which a position sensing device according to the invention is applied;

FIG. 4 is a perspective view of the lens driving module according to the invention, showing a state where the lens driving module is partially cut;

FIG. 5 is a plan view of the lens driving module according to the invention;

FIG. 6 is a cross-sectional view of a position sensing device according to the invention;

FIG. 7 is a diagram showing the operation of grids adopted in the position sensing device according to the invention; and FIG. 8 is a waveform diagram showing an output voltage at a lens-barrel position sensed by the pair of grids driven as shown in FIG. 7.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Hereinafter, a position sensing device and a lens driving module using the same according to the present invention will be described in detail with reference to the accompanying drawings.

Lens Driving Module

FIG. 3 is an exploded perspective view of a lens driving module to which a position sensing device according to the invention is applied. FIG. 4 is a perspective view of the lens driving module according to the invention, showing a state where the lens driving module is partially cut. FIG. 5 is a plan view of the lens driving module according to the invention.

As shown in the drawings, the lens driving module 100 according to the invention includes a base 101, a lens barrel 110 which is vertically driven inside the base 101, and a position sensing device 120 mounted on the lens barrel 110, and a piezoelectric actuator 130.

The base 101 has a barrel housing portion 102 provided in the central portion thereof, and the lens barrel 110 having one or more lenses L stacked therein is inserted into the barrel housing portion 102 so as to be vertically driven in an optical-axis direction of the lenses L.

The position sensing device 120 is mounted on one side of the lens barrel 110 and has a sensing unit 123 including a light receiving section 121 and a light emitting section 122 and a pair of grids 124 and 125 which are driven so as to overlap each other between the light receiving section 121 and the light emitting section 122.

In the sensing unit 123 of the position sensing device 120, the light receiving section 121 and the light emitting section 122 are formed so as to face each other. Between the light receiving section 121 and the light emitting section 122, the pair of grids 124 and 124, that is, a driven grid 124 attached to the lens barrel 110 and a fixed grid 125 attached to the inner surface of the sensing unit 123 are mounted. The grids 124 and 125 respectively have a plurality of slits 124a and 125a formed therein.

As for the light receiving section 121 of the sensing unit 123, a general photointerrupter (PI) may be used. Infrared rays emitted from the light emitting section 122 of the sensing unit 123 are received through the overlapping slits 124a and 125a of the driven grid 124 and the fixed grid 125.

The technical construction of the position sensing device 120 will be described more specifically.

The lens barrel 110 has a guide portion 111 formed in the opposite side to the mounted position of the position sensing device 120, and the piezoelectric actuator 130 for vertically driving the lens barrel 110 inside the barrel housing portion 102 of the base 101 is coupled to the guide portion 111.

The piezoelectric actuator 130 includes a piezoelectric vibrator 131 which vibrates in the longitudinal direction thereof and is deformed in the thickness direction thereof when a voltage is applied, a conductive buffer member 133 which is closely coupled to the piezoelectric vibrator 131, and a plate spring 134 for closely attaching the conductive buffer member 133 to the piezoelectric vibrator 131.

The piezoelectric vibrator 131 receives power from an FPCB 140 surrounding the outer surface of the lens barrel 110, the FPCB 140 being electrically connected to the conductive buffer member 133 which is closely coupled to the piezoelectric vibrator 131.

The piezoelectric vibrator 131 is a hexahedral piezoelectric ultrasonic motor in which a plurality of piezoelectric bodies is stacked. The piezoelectric vibrator 131 has a plurality of electrode terminals (not shown) provided outside and is deformed by power applied through the electrode terminals.

On the inner surface of the piezoelectric vibrator 131, a pair of friction members 131 is mounted. The friction members 131 come in line or point contact with a guide member 112 mounted on the guide portion 111 of the lens barrel 110 on which the piezoelectric vibrator 130 is mounted. A driving force caused by the friction between the guide member 112 and the friction members 132 through the displacement of the piezoelectric vibrator 131 is transmitted to the lens barrel 110 through the guide portion 111 such that the lens barrel 110 is vertically driven in the optical-axis direction.

Preferably, the guide member 112 and the friction member 132 are formed of a ceramic or metallic material of which the frictional coefficient is relatively large. The shape of the guide member 112 and the friction member 132 is not limited to a cylindrical shape, as shown in the drawings, but may be formed in a semi-circular or hexahedral shape.

Further, the guide member 112 and the friction members 132 are mounted in a direction perpendicular to the lens barrel 110 and the piezoelectric vibrator 131, respectively. Therefore, when the piezoelectric vibrator 131 is closely coupled, the driving force caused by the friction between the guide member 112 and the friction member 132 can be reliably transmitted to the lens barrel 110.

Meanwhile, the piezoelectric vibrator 131 is electrically connected to the FPCB 140, which is installed on a sidewall of the base so as to surround the outer surface of the lens barrel 110, and receives an electrical signal from the FPCB 140. Therefore, one end portion of the FPCB 140 is closely coupled to the conductive buffer member 133, which is closely coupled to the piezoelectric vibrator 131, such that the driving power of the piezoelectric vibrator 131 is applied.

The conductive buffer member 133 interposed between the piezoelectric vibrator 131 and the FPCB 140 delivers an electrical signal only through a predetermined portion, which is joined to the electrode terminals of the piezoelectric vibrator 131, such that the piezoelectric vibrator 131 and the FPCB 140 are electrically connected.

As the conductive buffer member 133 is interposed between the piezoelectric vibrator 131 an the FPCB 140, the displacement of the piezoelectric vibrator 131 is prevented from being restricted when the piezoelectric vibrator 131 is pressed and coupled to the guide portion 111 of the lens barrel 110. Further, a driving force generated when the piezoelectric vibrator 131 is deformed is elastically transmitted to the guide portion 111 formed on the lens barrel 110.

Further, the piezoelectric vibrator 131, the conductive buffer member 133, and the end portion of the FPCB 140 are reliably supported by the plate spring 134 which is closely coupled to the guide portion 111 of the lens barrel 110.

Position Sensing Device

FIGS. 6 to 8 are diagrams for explaining the specific construction and operation of the position sensing device according to the invention. FIG. 6 is a cross-sectional view of the position sensing device according to the invention. FIG. 7 is a diagram showing the operation of the grids adopted in the position sensing device according to the invention. FIG. 8 is a waveform diagram showing an output voltage at a lens-barrel position sensed by the pair of grids driven as shown in FIG. 7.

As shown in FIG. 6, the position sensing device 120 according to the invention includes the sensing unit 123 mounted in a corner of the base 101 corresponding to one side of the lens barrel 110 and the pair of grids 124 and 125 which are vertically driven inside sensing unit 123.

The sensing unit 123 is formed to have a U-shape body such that the light receiving section 121 and the light emitting section 122 face each other. The light emitting section 122 emits light such as infrared rays onto the light receiving section 121, and the light receiving section 121 receives the light emitted from the light emitting section 122 such that a voltage depending on the quantity of light is generated.

The light emitting section 122 has a light emitting chip such as LED. As for the light receiving section 121 receiving the light from the light emitting section 122, a light receiving element, such as a general PI, which converts an optical signal into a predetermined voltage, may be used.

The sensing unit 123 is fixed and mounted on a predetermined position of the base 101 such that the body of the sensing unit 123 composed of the light emitting section 122 and the light receiving section 121 surrounds a guide extending from one side of the lens barrel 110. Between the light emitting section 122 and the light receiving section 121 of the sensing unit 123, the driven grid 124 and the fixed grid 125 are installed.

The driven grid 124 and the fixed grid 125 respectively have the plurality of slits 124a and 125a formed on the entire surface thereof. As the driven grid 124 is vertically transferred, the slits 124a and 125a overlap each other.

At this time, the driven grid 124 attached to the lens barrel 110 is transferred in the optical-axis direction along the lens barrel 110 which is vertically transferred by the operation of the piezoelectric vibrator 130, and the fixed grid 125 is fixed and coupled to any one inner surface of the light emitting section 121 and the light receiving section 122 of the sensing unit 123.

Therefore, as the driven grid 124 is transferred in the optical-axis direction along the lens barrel 110 which is vertically transferred, the slits 124a and 125a repeatedly overlap each other. Through the overlapping slits 124a and 125a, the light emitted from the light emitting section 122 is incident on the light receiving section 121.

At this time, the overlapping area of the slits 124a and 125a varies depending on the position of the lens barrel 110 which is vertically driven. Therefore, a quantity of light transmitted through the overlapping slits 124a and 125a varies depending on the position of the lens barrel 110. In accordance with the variation in the quantity of light, a voltage into which an optical signal is converted by the light receiving section 121 varies. Accordingly, the position of the lens barrel 110 can be accurately sensed through the voltage variation.

Meanwhile, the slits 124a and 125a formed in the driven grid 124 and the fixed grid 125, respectively, are constructed in such manner that the widths thereof and the arrangement distances therebetween, respectively, are set to be equal to each other.

The width of the slits 124a and 125a may be set in the range of 0.5 to 20 μm. Preferably, the width may be set in the range of 5 to 10 µm, in order to sense the position of the lens barrel with more excellent resolution. More preferably, the width may be set in the range of 3 to 4 µm.

At this time, since the driven grid 124 is vertically driven in a state where the driven grid 124 faces the fixed grid 125, it is preferable that the width of the slits 124a and 125a is set to be equal to a focus adjustment distance of the lens barrel 110.

Now, a process of sensing the position of the lens barrel using the position sensing device according to the invention will be described with reference to FIGS. 7 and 8.

First, a predetermined driving voltage is applied to the piezoelectric actuator 130 through the FPCB 140 mounted on the lens driving module 100 such that the lens barrel 110 is moved in the optical-axis direction.

As the lens barrel 110 is vertically driven, the driven grid 124 mounted on the guide of the lens barrel 110 is vertically slid with respect to the fixed grid 125 fixed to the sensing unit 123 having the light emitting section 121 and the light receiving section 122 provided therein. Then, the overlapping area of the slits 124a and 125a formed in the fixed grid 125 and the driven grid 124, respectively, varies.

In this case, as shown in FIG. 7, the slits 124a and 125a of the driven grid 124 and the fixed grid 125 repeatedly overlap each other and deviate from each other. In a state indicated by ① and ⑤, the slits 124a and 125a completely overlap each other such that light emitted from the light emitting section 122 is transmitted through the slits 124a and 125a. In a state indicated by ② and ④, the slits 124a and 125a partially overlap each other. In a state indicated by ③, the slits 124a and 125a are disposed so as to deviate from each other such that the light emitted from the light emitting section 122 is not transmitted through the slits 124a and 125a.

In the state indicated by ① and ⑤, since the transmittance of the light emitted from the light emitting section 122 is maximized, the light is converted into a high voltage by the light receiving section 124. In the state indicated by ③, since the transmittance of the light emitted from the light emitting section 122 is minimized, the light is converted into a low voltage by the light receiving section 121.

As such, the quantity of light incident on the light receiving section 121 varies depending on the overlapping area of the slits 124a and 125a formed in the driven grid 124 and the fixed grid 125, and the position of the lens barrel 110 is sensed by a voltage difference in the light receiving section 121 caused by the varying quantity of light.

More specifically, the magnitudes of the voltages output through the light receiving section 121, for example, the maximum voltage in the state of ① and ⑤ and the minimum voltage in the state of ③ are recognized, and a movement distance of the lens barrel 110 is calculated through a difference between the maximum voltage and the minimum voltage.

For example, the width of the slits 124a and 125a formed in the drive grid 124 and the fixed grid 125 is set to 5 µm, and the position of the lens barrel 100 in the state of ① is set to a reference point. In this case, when the minimum voltage in the state of ③ is sensed, a movement distance of 5 µm is sensed, because the movement distance is recognized as a movement distance corresponding to the width of the slits 124a and 125a. When the maximum voltage in the state of ⑤ is sensed, a movement distance of 10 µm is recognized as a movement distance of the lens barrel 110. Therefore, the movement distance from the position in the state of ① to the position in the state of ⑤ can be calculated.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A position sensing device comprising:
a sensing unit that is mounted on one side of a lens barrel, which is inserted into a lens housing portion of a base so as to be vertically driven, and includes a light receiving section and a light emitting section which are provided to face each other;
a driven grid that has a plurality of slits formed therein and is mounted on the lens barrel; and
a fixed grid that has a plurality of slits formed therein and is fixed and coupled to the inside of the sensing unit; and
wherein the width of the slits is set to the same value as a focus adjustment distance of the lens barrel.

2. The position sensing device according to claim 1, wherein the sensing unit having a body formed in a U shape is mounted on a wall portion of the base, and the light receiving section receives light emitted from the light emitting section so as to generate a voltage.

3. The position sensing device according to claim 2, wherein the light emitting section of the sensing unit includes a light emitting chip which emits infrared rays, and the light receiving section includes a light receiving element which receives the light emitted from the light emitting section.

4. The position sensing device according to claim 1, wherein the slits formed in the driven grid and the fixed grid, respectively, repeatedly overlap each other such that the light emitted from the light emitting section is transmitted through the overlapping slits so as to be incident on the light receiving section.

5. The position sensing device according to claim 4, wherein the slits have the same width in the longitudinal direction thereof, and the distance between the slits is constant.

6. The position sensing device according to claim 5, wherein the width of the slits is set in the range of 0.5 to 20 µm.

7. The position sensing device according to claim 5, wherein the width of the slits is set in the range of 5 to 10 µm.

8. A lens driving module comprising:
a base that has a barrel housing portion formed in the central portion thereof;
a lens barrel that is inserted into the base so as to be vertically driven and has one or more lenses stacked therein;
a position sensing device that is mounted in one side of the lens barrel and has a sensing unit including a light receiving section and a light emitting section, which are formed so as to face each other, and a pair of grids respectively including a plurality of slits formed therein, the slits repeatedly overlapping each other inside the sensing unit;
a piezoelectric actuator that is mounted on the other side of the lens barrel and moves the lens barrel in an optical-axis direction when a voltage is applied; and
a flexible printed circuit board (FPCB) that surrounds the outside of the barrel housing portion and of which one side portion is connected to a driving unit so as to apply an electric signal.

9. The lens driving module according to claim 8, wherein the sensing unit having a body formed in a U shape is mounted on a wall portion of the base, and the light receiving section receives light emitted from the light emitting section through the overlapping slits so as to generate a voltage.

10. The lens driving module according to claim 8, wherein the slits have the same width in the longitudinal direction thereof, and the distance between the slits is constant.

11. The lens driving module according to claim 10, wherein the width of the slits is set in the range of 0.5 to 20 µm.

12. The lens driving module according to claim 8, wherein the piezoelectric actuator, which is contact-supported by a guide portion extending from the lens barrel, vibrates in the longitudinal direction thereof and is deformed in the thickness direction thereof so as to vertically drive the lens barrel in the optical-axis direction.

13. The lens driving module according to claim 8, wherein the piezoelectric actuator includes a piezoelectric vibrator, a conductive buffer member which is closely coupled to the piezoelectric vibrator, and a plate spring for closely attaching the piezoelectric vibrator to the conductive buffer member.

14. The lens driving module according to claim 13, wherein the piezoelectric vibrator has a pair of friction members mounted on the inner surface thereof.

\* \* \* \* \*